United States Patent [19]
Yamamoto

[11] Patent Number: 5,504,555
[45] Date of Patent: Apr. 2, 1996

[54] APPARATUS FOR SUPPLYING PHOTOSENSITIVE MATERIAL

[75] Inventor: Yuji Yamamoto, Wakayama, Japan

[73] Assignee: Noritsu Koki Co., Ltd., Wakayama, Japan

[21] Appl. No.: 231,125

[22] Filed: Apr. 22, 1994

[30] Foreign Application Priority Data

Apr. 26, 1993 [JP] Japan ................................ 5-099294
Jun. 4, 1993 [JP] Japan ................................ 5-134639

[51] Int. Cl.⁶ .................................................... B26D 5/00
[52] U.S. Cl. ........................... 355/29; 355/72; 355/310; 355/40
[58] Field of Search ......................... 355/29, 72, 310, 355/311, 40, 41

[56] References Cited

U.S. PATENT DOCUMENTS

| | | | |
|---|---|---|---|
| 3,992,089 | 11/1976 | Hirose et al. | |
| 5,223,854 | 6/1993 | Shimizu | 355/310 X |
| 5,237,379 | 8/1993 | Sklut et al. | 355/311 |
| 5,257,567 | 11/1993 | Walker et al. | 83/74 |
| 5,260,740 | 11/1993 | Seto | 355/41 |
| 5,287,159 | 2/1994 | Sakakibara | 355/311 |
| 5,287,164 | 2/1994 | Watanabe | 355/311 |
| 5,307,114 | 4/1994 | Nitsch et al. | 355/29 |
| 5,328,166 | 7/1994 | Hokamura | 355/311 X |

FOREIGN PATENT DOCUMENTS

| | | |
|---|---|---|
| 0149035 | 7/1985 | European Pat. Off. . |
| 0367879 | 5/1990 | European Pat. Off. . |
| 2619549 | 2/1989 | France . |
| 2923469 | 12/1980 | Germany . |
| 3331126 | 3/1984 | Germany . |

*Primary Examiner*—David M. Gray
*Assistant Examiner*—Daniel P. Malley
*Attorney, Agent, or Firm*—Wenderoth, Lind & Ponack

[57] ABSTRACT

An apparatus for selectively supplies one of a plurality of photosensitive materials having different widths to an exposure unit. The width of the potosensitive material and the exposure unit.

The width of the photosensitive material and a width of the image frame are detected. By comparing the detected widths with each other, a control circuit will select the magazine accommodating the photosensitive material having a width corresponding to that of the image frame. If the selected magazine is already supplying the photosensitive material, it continues to feed it. If not, the control circuit will command to cut off the exposed portion of the photosensitive material, rewind its nonexposed portion by the transfer means, and deliver only the printed photosensitive material remained in the exposure unit. Then, the control circuit selects the photosensitive material whose width corresponds to that of the image frame. Thus, the photosensitive material is changed over automatically according to the width of the image frame of the negative film.

1 Claim, 5 Drawing Sheets

5,504,555

APPARATUS FOR SUPPLYING PHOTOSENSITIVE MATERIAL

BACKGROUND OF THE INVENTION

This invention relates to an apparatus for selectively supplying one of a plurality of photosensitive materials having different widths to an exposure unit.

In a conventional film printing apparatus in which images on a negative film are continuously printed on a web of photosensitive material, if the print size is changed, it is ordinary practice to replace the photosensitive material with the one having a width corresponding to the new print size.

In order to simplify the replacement of the photosensitive materials, a film printing apparatus was proposed in which two rolls of the photosensitive materials having different widths are separately accommodated in two magazines that are detachably mounted to an apparatus body so that the photosensitive materials can be replaced and fed from each magazine to an exposure unit.

However, in such a film printing apparatus, during replacement of the photosensitive materials, a driving roller is rotated in a reverse direction to feed the photosensitive material remaining in the transfer path toward the magazine, and the photosensitive material is taken up by manually rotating the roll in the magazine. Thus, it was troublesome to replace the photosensitive materials. Further, since the photosensitive material was taken up by manually rotating the roll, the tip portion of the photosensitive material often got caught in the magazine because the take-up speed of the photosensitive material was too high.

SUMMARY OF THE INVENTION

A first object of the present invention is to automate the changeover operation of photosensitive material and to obviate troubles in the replacement thereof.

A second object of the present invention is to provide an apparatus for supplying a photosensitive material in which, when the photosensitive material is rewound, its tip portion will not get caught in a magazine.

In order to attain the first object of the present invention, there is provided an apparatus for supplying a photosensitive material to an exposure unit. The apparatus has a plurality of magazines that each accommodate a roll of photosensitive material, the rolls of photosensitive material having different widths from each other. One of the magazines accommodates a desired photosensitive material that is being selected, and the photosensitive material drawn from the magazine is fed to the exposure unit. The apparatus further comprises a transfer means for feeding and rewinding the photosensitive materials accommodated in the magazines to and from the exposure unit. A cutter means for cutting off the printed portion of the photosensitive material. An image width detecting means detects the width of an image frame of a negative film fed to the exposure unit, and a width detecting means detects widths of the photosensitive materials accommodated in the magazines. A control means compares the output of the width detecting means with the output of the image width detecting means, selects the magazine accommodating the photosensitive material having a width corresponding to that of the image frame based on the result of the comparison, feeds the photosensitive material accommodated in the selected magazine toward the exposure unit by means of the transfer means, and cuts and rewinds the photosensitive material now supplied in the exposure unit to the magazine.

In order to attain the second object of the present invention, there is provided an apparatus for supplying a photosensitive material, wherein the transfer means comprises a driving roller provided for each of the magazines for carrying the photosensitive material, a roller driving unit for rotating the driving roller in two opposite directions, a torque transmission means for transmitting to a rotary member coaxial with a roll the rotation of the driving roller only in a direction for rewinding the photosensitive material, friction means disposed between the rotary member and the roll for shutting off the transmission of the rotation to the roll when a load applied to the roll exceeds a predetermined value and a tip detecting sensor means provided downstream of the driving roller for stopping the roller driving unit when it detects the tip of the photosensitive material.

In the apparatus according to the present invention, when a negative film is fed to the exposure unit, the magazine accommodating the photosensitive material whose width corresponds to that of the image frame of the negative film, will supply the photosensitive material.

The negative film, fed to the exposure unit, has its width of the image frame detected by the image detecting sensor, and the detected output is inputted in a control circuit. The control circuit, having read out the width of the photosensitive material in each magazine with the detecting means, selects the magazine, which corresponds to the image frame by comparing the width of image frame with the material width. Then, the selected magazine will supply the photosensitive material.

If the selected magazine is the one which is then supplying photosensitive material to the exposure stage, it continues to feed it with the transfer means.

On the other hand, if the selected magazine is not the one which is then supplying the photosensitive material to the exposure stage, the control circuit will command a cut of the exposed portion of the photosensitive material, rewind its non-exposed portion with the transfer means, and deliver only the printed photosensitive material remaining in the exposure unit.

Thus, after the photosensitive material in the exposure unit has been rewound, the control circuit selects the magazine which accommodates the photosensitive material whose width corresponds to that of the image frame. The selected magazine then delivers the photosensitive material, with the transfer means, to the exposure stage.

In the exposure stage, an image frame of the intended size is printed by printing the negative image on the negative film on the photosensitive material.

In the arrangement in which the transfer means comprises a friction member in a transmission system in which the rotation of a driving roller is transmitted to a rotary body coaxial with the roll of photosensitive material and the rotation of the rotary body is transmitted to the roll, when the photosensitive material is rewound by driving the driving roller, the rotation of the driving roller is transmitted to the roll of material so that the roll will receive the photosensitive material at a speed which increases as the roll diameter increases. When the speed becomes higher than the speed at which the driving roller rewinds the photosensitive material, slip will occur at the friction member so that the transmission of torque to the roll is cut off. This prevents excessive take-up of the material on the roll. When the tip of the photosensitive material has passed the tip detecting sensor, the roller driving unit is stopped.

According to the present invention, the width detecting means for detecting the width of the photosensitive material is provided for the magazine and the image width detecting sensor for detecting the width of the image frame is provided at the exposure unit. By comparing the detected widths with each other, the control circuit will select the photosensitive material having a width corresponding to that of an image frame and command the feed of the selected photosensitive material and rewind the photosensitive material remaining in the exposure unit. Thus, the photosensitive material is changed over automatically according to the width of the image frame of the negative film.

Further, downstream of the driving roller which serves to feed and rewind the photosensitive material is provided the tip detecting sensor for detecting the tip of the photosensitive material. When the tip detecting sensor detects the tip of the photosensitive material that is being rewound, the driving roller will stop the roller driving unit. Thus, the tip of the photosensitive material is prevented from getting caught in the magazine.

BRIEF DESCRIPTION OF THE DRAWINGS

Other features and objects of the present invention will become apparent from the following description, made with reference to the accompanying drawings, in which.

DETAILED DESCRIPTION OF THE PREFERRED EMBODIMENTS

Figure 1:
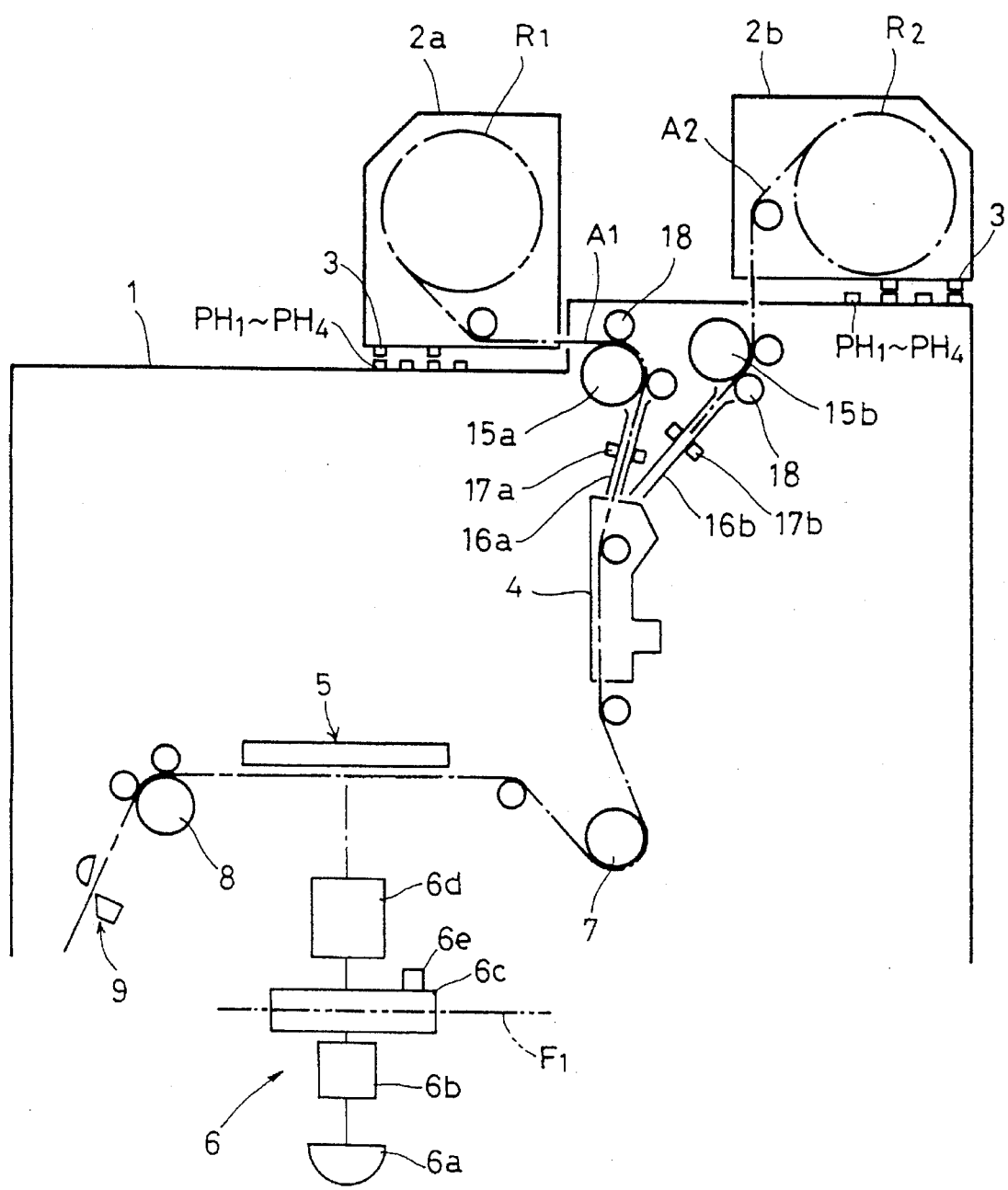
FIG. 1 is a schematic view of a film printing apparatus having a apparatus for supplying the photosensitive material according to the present invention.
Figure 2:
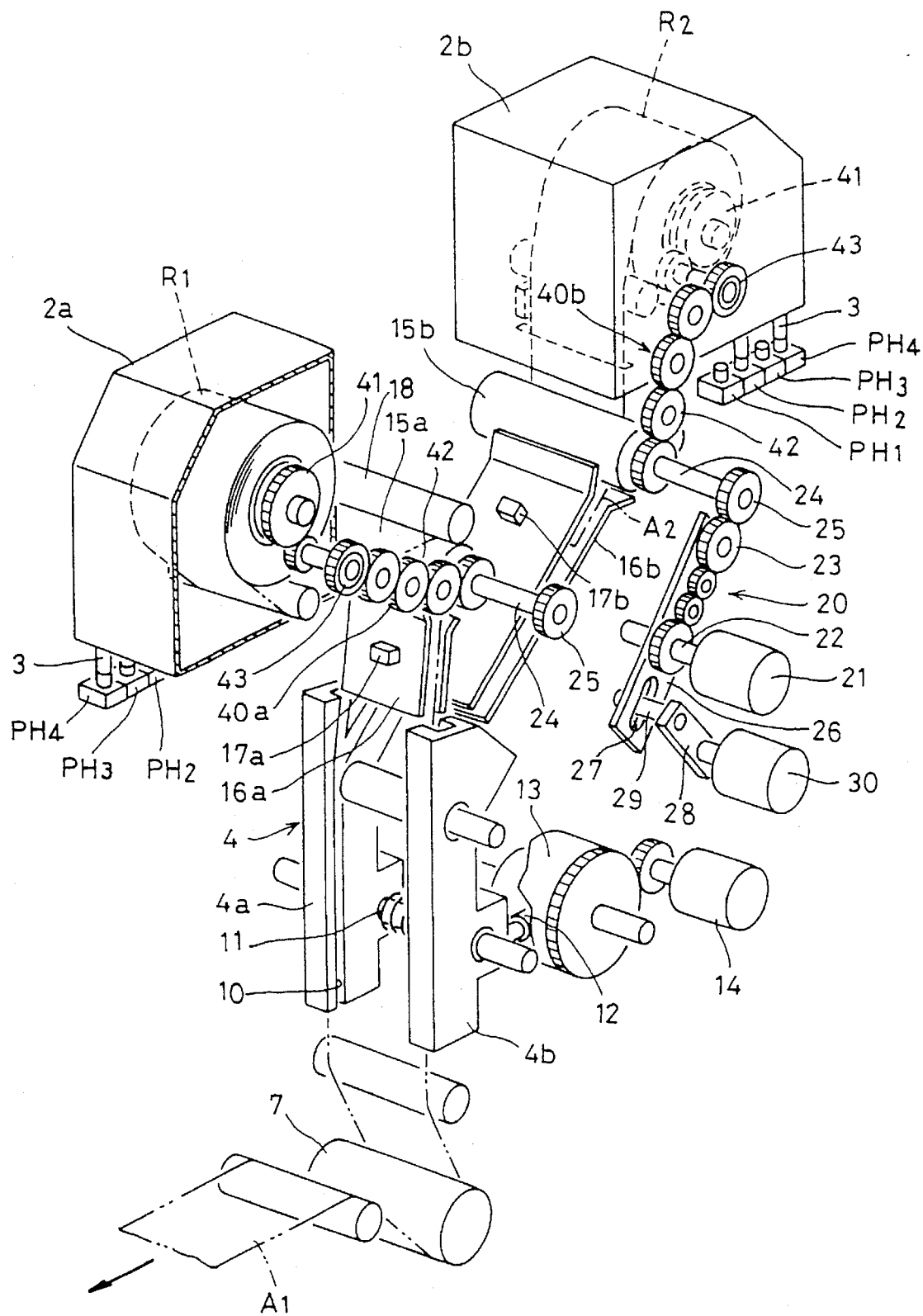
FIG. 2 is a partially cutaway perspective view showing the same in more detail.

FIG. 1 shows a schematic view of a film printing apparatus according to a first embodiment. On top of an apparatus body 1 are detachably mounted a pair of magazines 2a and 2b which accommodate rolls R1 and R2 of photosensitive materials A1 and A2, respectively. The photosensitive materials A1 and A2 have different widths to correspond to print size of the negative film. As shown in FIG. 2, their widths are detected by a plurality of width detecting sensors (parts of a width detecting means) PH1, PH2, PH3 and PH4 which detect width detecting pins 3 mounted at bottom of the magazines 2a and 2b.

The width detecting pins 3 (parts of the width detecting means) are detachably inserted in a plurality of pin holes (not shown) formed in the bottom of the magazines 2a and 2b. Their position may be changed according to the widths of the photosensitive materials A1 and A2 in the magazines 2a and 2b.

The photosensitive material A1 or A2 drawn out of the magazine 2a or 2b is introduced to an exposure stage 5 through a width guide 4. A negative image on a negative film F1 is printed on the photosensitive material A1 or A2 by a printing unit 6 (FIG. 1).

The printing unit 6 comprises an exposure lamp 6a, a mirror tunnel 6b, an automatic negative mask 6c and a lens 6d. As shown in FIG. 1, the automatic negative mask 6c is placed on the transfer path of the negative film F1 so that the width of the image frame of the negative film F1 being carried is detected by an image detecting sensor (image width detecting in) 6e. The dimension of the mask is changed according to the detected width of the image frame so as to form an intended negative image on the exposure stage 5. In this embodiment, the output from the image detecting sensor 6e of the automatic negative mask 6c is also used as the output of an image detecting sensor in the film printing apparatus.

Upstream of the exposure stage 5 is provided a tension roller 7 to impart a predetermined tension to the photosensitive material A1 or A2. An advance roller 8 and a cutter device 9 are provided downstream of the exposure stage 5.

As shown in FIG. 2, the width guide 4 comprises a pair of guide frames 4a and 4b. Guide grooves 10 are formed in the opposing surfaces of the guide frames 4a and 4b to guide side edges of the photosensitive material A1 or A2. The guide frames 4a and 4b, supported movably relative to each other, are pressed away from each other by a spring 11. Contact elements 12 in the form of rollers provided on the respective guide frames 4a and 4b are pressed against a width adjusting cam 13. The contact element and the width adjusting cam mounted for the guide frame 4a are not shown in the figure.

The width adjusting cam 13 is rotated by a motor 14. The width guide 4 is adjusted to a width corresponding to that of the photosensitive material A1 or A2 by the rotation of the width adjusting cam 13.

On the transfer paths of the photosensitive materials A1 and A2 from the magazines 2a and 2b to the width guide 4, transfer means are provided for feeding and rewinding the photosensitive materials A1 and A2 in the magazines 2a and 2b. The transfer means comprises a pair of driving rollers 15a and 15b for feeding the photosensitive materials, paper guides 16a and 16b downstream of the driving rollers 15a and 15b for introducing the photosensitive materials A1 and A2 to the width guide 4, and tip detecting sensors 17a and 17b provided on the paper guides 16a and 16b for detecting the tips of the photosensitive materials A1 and A2 (FIG. 1).

A pressing roller 18 is pressed against the driving rollers 15a and 15b. The rollers 15a and 15b are rotated by a roller driving unit 20 which comprises a roller driving motor 21 with a rotary shaft 22 whose rotation is transmitted through a plurality of gears 23 to driven gears 25 mounted on roller shafts 24 of the driving rollers 15a and 15b (FIG. 2).

The gears 23 are rotatably supported by a gear support arm 26, which is in turn supported by the rotary shaft 22 of the roller driving motor 21 so as to be rotatable therearound. The gear support arm 26 has on its rear end a long hole 27 in which is inserted a pin 29 provided on one end of a changeover arm 28. Thus, when the changeover arm 28 is pivoted by a changeover motor 30, the gear support arm 26 pivots around the rotary shaft 22 of the roller driving motor 21. Thus, its rotation is selectively transmitted to one of the driving rollers 15a and 15b.

The rotations of the driving rollers 15a and 15b in a direction for rewinding the photosensitive materials A1 and A2 are transmitted through torque transmission mechanisms 40a and 40b to gears 41, which are rotary members mounted concentrically with the rolls R1 and R2 in the magazines 2a and 2b, respectively.

Each of the torque transmission mechanisms 40a and 40b comprises a plurality of gears 42 and a one-way clutch 43 mounted on one of the gears 42. The one-way clutch 43 is locked while the driving roller 15a or 15b is rotated in a direction for rewinding the photosensitive material A1 or A2. On the other hand, it is free while the driving roller 15a or 15b is rotated in a direction for feeding the photosensitive material A1 or A2.

Thus, the torque transmission mechanisms 40a and 40b transmit to the gear 41 the rotation of the driving rollers 15a and 15b only in a direction for rewinding the photosensitive materials, but not the rotation in the opposite direction.

Figure 3:
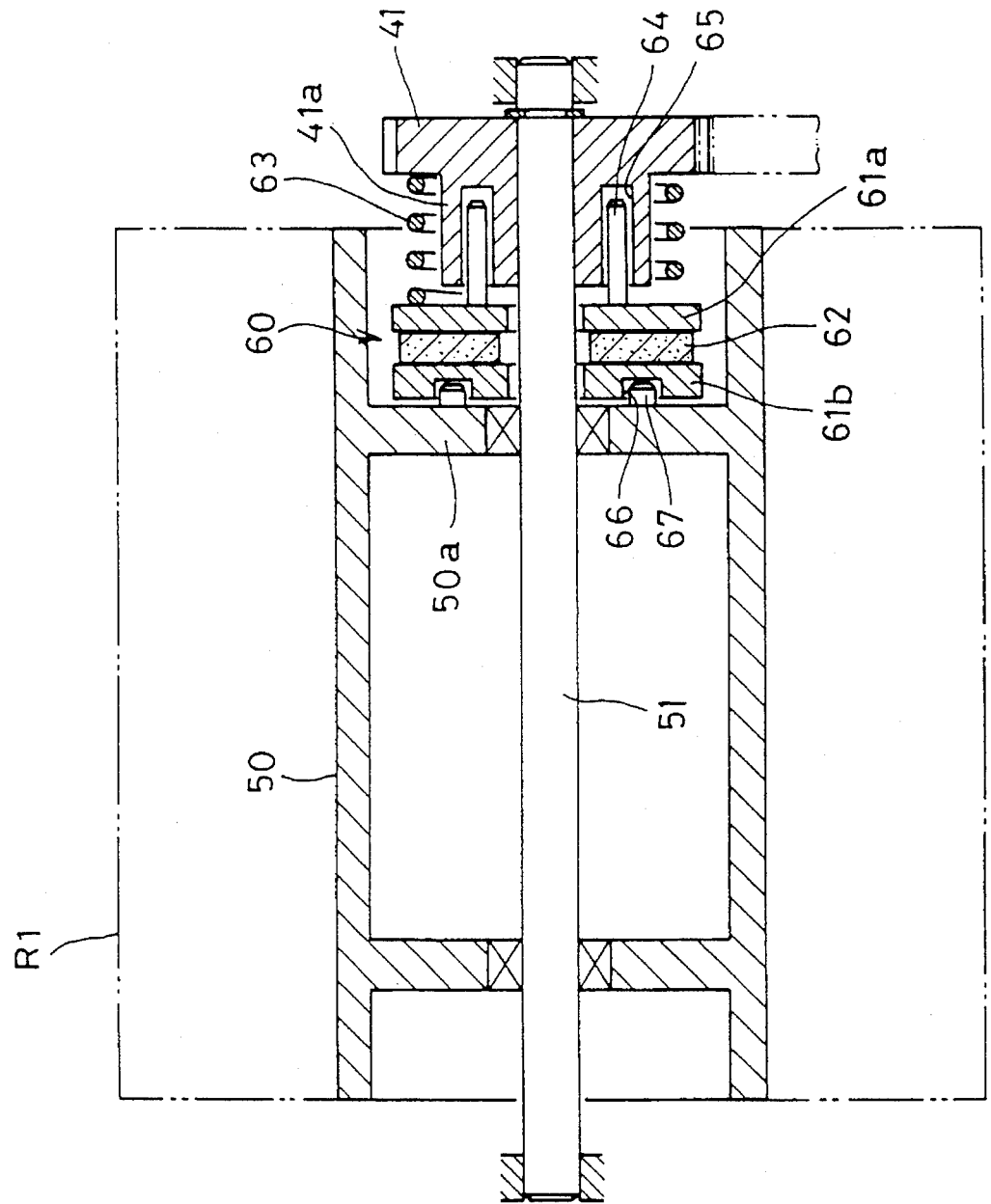
FIG. 3 is a sectional view of the roll support portion of the same.

FIG. 3 shows a support portion for the roll R1 accommodated in the magazine 2a. Since the support portion for the roll R2 accommodated in the magazine 2b has the same structure as in FIG. 3, its description is omitted.

The roll R1 has a core 50 rotatably supported by a support shaft 51. The gear 41 to which the rotation of the driving roller 15a is transmitted is rotatably supported on the support shaft 51. Between the gear 41 and the core 50 is provided a friction mechanism 60.

The friction mechanism 60 comprises a pair of circular plates 61a and 61b, a friction plate 62 disposed therebetween, and a spring 63 mounted on a boss 41a of the gear 41 for pressing the plates 61a, 61b and 62 toward an end plate 50a of the core 50. Pins 64 mounted on the circular plate 61a near the gear 41 are inserted in pin holes 65 formed in the boss 41a of the gear 41 to prevent the circular plate 61a and the gear 41 from rotating relative to each other. Pins 67 mounted on the end plate 50a of the core 50 are received in pin holes 66 formed in the circular plate 61b near the core 50 to prevent the core 50 and the circular plate 61b from rotating relative to each other.

The friction mechanism 60 transmits the rotation of the gear 41 to the roll R1 or R2 by a friction force acting between the pair of the circular plates 61a and 61b and the friction plate 62. When the rotational resistance applied to the roll R1 or R2 exceeds the friction force, slip will occur between the pair of circular plates 61a and 61b and the friction plate 62.

Figure 4:
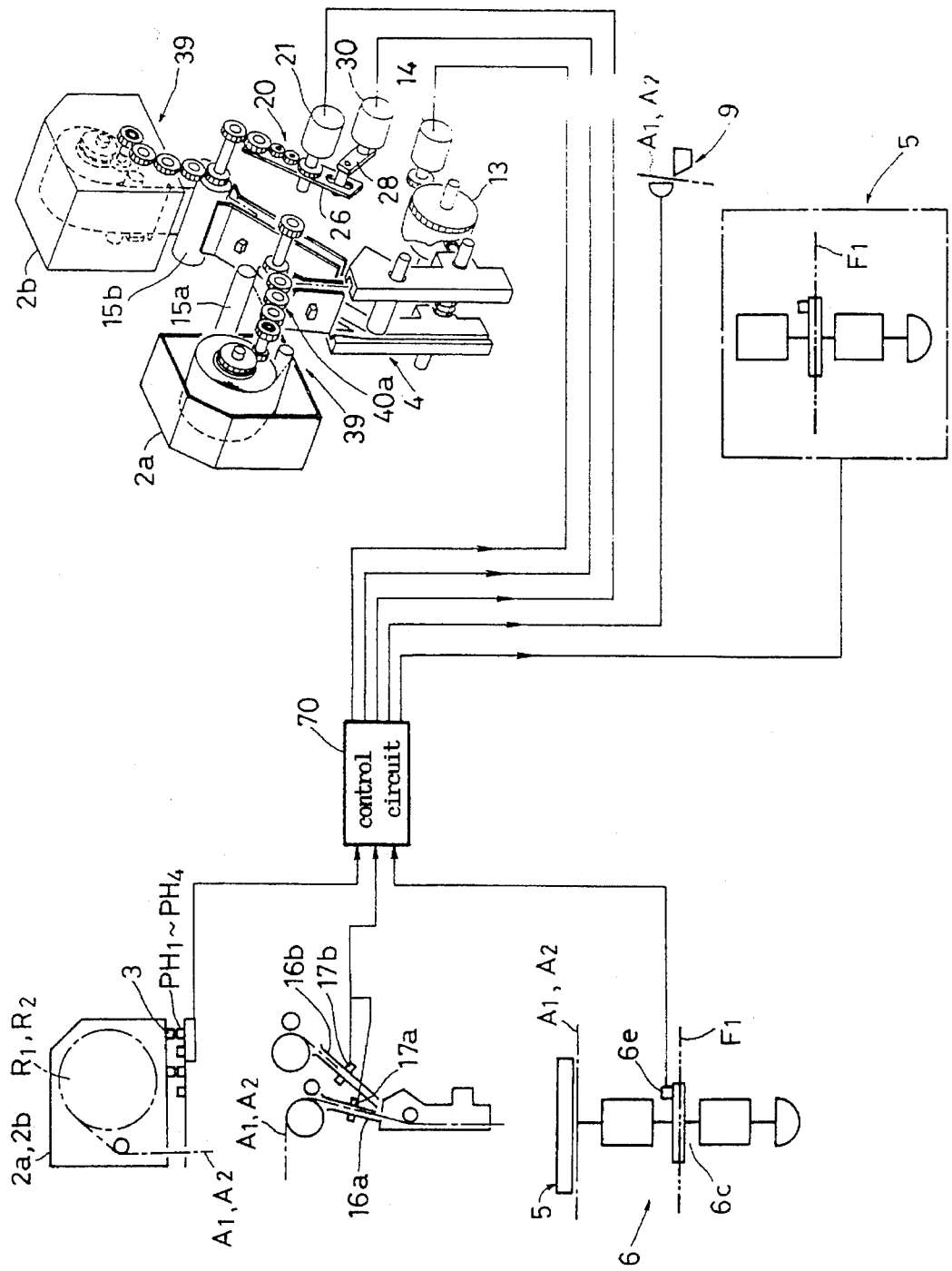
FIG. 4 is a block diagram of a circuit control of the same.

The mechanism of the first embodiment is arranged as above. Each component part is controlled by a control circuit 70 as shown in FIG. 4. The photosensitive materials A1 and A2 are automatically changed over in the following manner.

The outputs from the width detecting sensors PH1–PH4 for detecting the widths of the photosensitive materials A1 and A2 in the magazines 2a and 2b, from the image detecting sensor 6e of the automatic negative mask 6c in the printing unit 6, and from the tip detecting sensors 17a and 17b of the paper guides 16a and 16b are inputted into the control circuit 70. In response to the outputs, the control circuit 70 controls the motor 14 for driving the width adjusting cam 13 to adjust the widths of the width guide 4, the roller driving motor 21 in the roller driving unit 20, the changeover motor 30 of the changeover arm 28, the cutter device 9 and the printing unit 6, which are all connected to the control circuit 70, by a sequence program in the control circuit to automatically change over the photosensitive materials A1 and A2.

Namely, the control circuit 70 compares the width of the photosensitive material A1 or A2 in the magazine 2a or 2b detected by the width detection sensors PH1–PH4 with the width of the image frame of the negative film F1 detected by the image detecting sensor 6e. Assuming that the photosensitive material A1 is now being supplied into the exposure stage 5, if the width of the image frame does not correspond to that of the photosensitive material A1, the control circuit 70 will activate the cutter device 9 to cut the photosensitive material A1 and rotate the roller driving motor 21 of the roller driving unit 20 in the opposite direction to rotate the driving roller 15a in the opposite direction.

Furthermore, the rotation of the driving roller 15a is transmitted to the roll R1. The photosensitive material A1 is rewound until its tip is detected by the tip detecting sensor 17a. In view of the widths of the photosensitive materials A1 and A2 in the magazines 2a and 2b detected by the width detecting sensors PH1–PH4, the magazine 2b accommodating the photosensitive material A2 having a corresponding width is selected. Next, the changeover motor 30 in the changeover arm 28 will be activated to pivot the gear support arm 26 until it is connected to the driving roller 15b. The driving roller 15b is rotated in a normal direction so that the photosensitive material A2 in the thus selected magazine 2b will be fed to the exposure stage 5.

At the same time, the motor 14 for the width adjusting cam 13 in the width guide 4 will be activated. Thus, the width of the width guide 4 is adjusted to feed the selected photosensitive material A2.

Now we shall explain how the photosensitive material A1 or A2 is changed over according to the width of the image of the negative film F1 fed into the film printing apparatus. For example, let us assume that a full size image (24 mm×36 mm) and a panorama size image (13 mm×36 mm) of a 135F negative film F1 are to be continuously printed.

The magazines 2a and 2b are firstly mounted on the apparatus body 1. In the magazine 2a, the roll R1 of the photosensitive material A1 having a width of 125 mm for printing the L size of full-size image is mounted. In the magazine 2b, the roll R2 of the photosensitive material A2 having a width of 89 mm for printing the panorama size is mounted. The width detecting pins 3 in the magazines 2a and 2b are so set as to detect the widths of the photosensitive materials A1 and A2 in the magazines 2a and 2b. Also, for starting the operation, the tips of the photosensitive materials A1 and A2 are drawn from the magazines 2a and 2b and placed on the paper guides 16a and 16b.

In this state, if, for example, the negative film F1 having the full-size image is supplied into the automatic negative mask 6c, the width of the image frame will be detected by the image detecting sensor 6e of the automatic negative mask 6c.

The data about the width of the image frame now read will be inputted in the control circuit 70 and compared with the data about the respective widths of the photosensitive materials A1 and A2 in the magazines 2a and 2b detected by the width detecting sensors PH1–PH4.

In this state, the roll R1 of the photosensitive material A1 having a width of 125 mm corresponds to the full-size negative film F1. Thus, the control circuit 70 will activate the changeover motor 30 to pivot the gear support arm 26 around the rotary shaft 22 of the roller driving motor 21. The control circuit 70 then changes over the driving path by bringing the gear 23 at one end of the gear support arm 26 into engagement with the driven gear 25 of the driving roller 15a which opposes to the photosensitive material A1. Next, by rotating the driving roller 15a connected to the roller driving unit 20 in a normal direction, the photosensitive material A1 is fed from the magazine 2a to the exposure stage 5. As shown in FIG. 1, with the photosensitive material A1 in the magazine 2a drawn to the exposure stage 5, the image will be printed by means of the printing unit 6 onto the photosensitive material A1.

After one image frame is printed, the next image frame is carried to the automatic negative mask 6c. At the same time, the photosensitive material A1 is drawn from the magazine 2a by driving the driving roller 15a and the next image of the negative film F1 is now printed thereon.

If the negative film F1 having a panorama size image is carried into the apparatus which has been printing the full-size image, the width of the image frame of the negative film F1 carried to the exposure stage 5 is detected by the image detecting sensor 6e of the automatic negative mask 6c and inputted in the control circuit 70. Thus, each frame has its width detected by the image width detecting means or image detecting sensor 6e.

After this width has been inputted, the control circuit 70 compares the now inputted width of the image frame with the widths of the photosensitive materials A1 and A2 in the magazines 2a and 2b detected by the width detecting sensors PH1–PH4. Since the width of the image frame does not correspond to that of the photosensitive material A1 now supplied into the exposure stage 5, the control circuit 70 will change over the photosensitive materials A1 and A2.

For the changeover, the control circuit 70 will activate the advance roller 8 to feed the photosensitive material A1 in the forward direction. After the printed portion of the photosensitive material A1 has passed the cutter device 9, the control circuit 70 will activate the cutter device 9 to cut the photosensitive material A1.

Next, the roller driving motor 21 is driven to rotate the driving roller 15a in a direction to rewind the photosensitive material A1. The photosensitive material A1 is withdrawn from the exposure stage 5. The rotation of the driving roller 15a is transmitted through the torque transmission mechanism 40a to the gear 41 provided concentrically with the roll R1. Since the rotation of the gear 41 is transmitted to the core 50 through the friction mechanism 60, the roll R1 rotates to take up the photosensitive material A1 rewound by the driving roller 15a.

The rotating speed of the roll R1 is set to be always higher than that of the driving roller 15a. Thus, the take-up speed thereof exceeds the feed speed of the photosensitive material A1 driven by the driving roller 15a.

As the tension of the photosensitive material A1 increases, the rotational resistance applied to the roll R1 also increases. When the latter exceeds the torque value preset for the friction mechanism 60, slip will occur between the circular plates 61a and 61b and the friction plate 62, so that the transmission of the rotation to the roll R1 is shut off and the photosensitive material A1 is taken up around the roll R1 with a constant tension.

When the tip of the photosensitive material A1 is detected by the tip detecting sensor 17a, the control circuit 70 will stop the roller driving motor 21. Thus, the tip of the photosensitive material A1 is prevented from being taken up into the magazine 2a. The tip of the photosensitive material A1 is retained downstream of the driving roller 15a in the standby for the feed to the exposure stage 5.

After completing the rewinding, the control circuit 70 drives the motor 14 for the width adjusting cam 13 to adjust the width of the width guide 14 to the width of the photosensitive material A2 detected by the width detecting sensor PH1–PH4.

After the width of the width guide 4 has been adjusted to the width of the photosensitive material A2, the control circuit 70 will activate the changeover motor 30 to change over the roller driving unit 20 in a direction which the driving roller 15b rotates as shown in FIG. 2. Now the driving roller 15b rotates in such a direction as to feed the photosensitive material A2. When the tip portion of the photosensitive material A2 has been fed to the advance roller 8 while the photosensitive material A2 is being fed from the roll R2 in the magazine 2b, the control circuit 70 will stop the roller driving motor 21.

While the photosensitive material A2 is being fed, the rotation of the driving roller 15b is not transmitted to the roll R2. Instead, the roll R2 turns only by the feed of the photosensitive material A2. In this state, the friction mechanism 60 serves to impart the rotational resistance to the roll R2 to prevent it from rotating too much.

On the photosensitive material A2 thus fed to the exposure stage 5 is printed a negative image of panorama size by the printing unit 6.

After one image frame is printed, the next image frame is carried to the automatic negative mask 6c. The negative images of the negative film F1 are printed continuously by driving the driving roller 15b.

In the same manner, every time the size or the width of frame of the negative film F1 changes, the photosensitive materials A1 and A2 are changed over.

As described above, in this embodiment, when the negative film F1 having a different width of image frame is carried in, one of the photosensitive materials A1 and A2 having the corresponding width is introduced to the exposure stage 5 and printed automatically.

Figure 5:
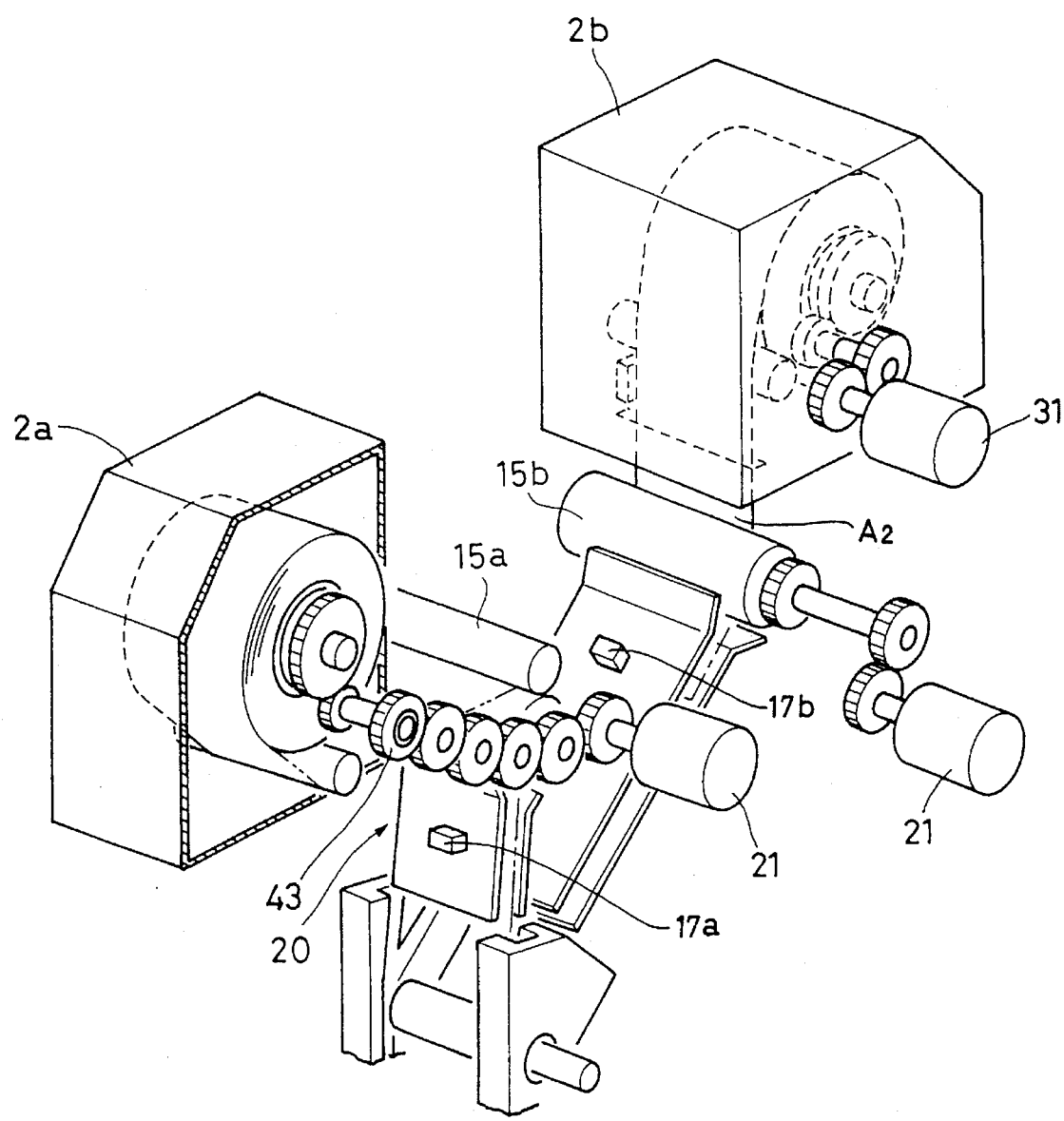
FIG. 5 is a partially cutaway perspective view of another embodiment of the apparatus for supplying photosensitive material according to the present invention.

FIG. 5 shows a second embodiment. In the first embodiment, the two driving rollers 15a and 15b are changed over by the single roller driving unit 20. In the second embodiment, one roller driving motor 21 is provided for each of the driving rollers 15a and 15b. These roller driving motors 21 are directly activated by the control circuit 70.

In FIG. 5 a motor 31 is provided exclusively for taking up the photosensitive material A2. This will reduce the number of the parts such as the one-way clutch 43. As a result, the failure rate and the cost will also be reduced.

Also, by providing a brake circuit for the motor in the control circuit 70, the motor can be set to stop at the points of the tip detecting sensors 17a and 17b for the photosensitive materials A1 and A2. This prevents the photosensitive materials A1 and A2 from getting caught in the magazines 2a and 2b while they are taken up.

Two magazines are provided in the above embodiments, but no limitation is intended.

Furthermore, the film printing apparatus according to present invention is applicable to the negative film having different negative image widths, such as full size and panorama size.

In the above embodiments, the image detecting sensor for the automatic negative mask is used to detect the width of the image frame, but no limitation is intended. For example, the image detecting sensor may be in the form of a line sensor provided on the carrier path of the negative film.

What is claimed is:

1. An apparatus, comprising:

an exposure unit for exposing photosensitive material to an image frame of a negative film;

a plurality of magazines each accommodating a roll of photosensitive material, each roll of photosensitive material accommodated in said plurality of magazines having a different width;

a transfer means for feeding and rewinding photosensitive material from said plurality of magazines to and from said exposure unit;

a cutter means for cutting off a printed portion of photosensitive material that has been fed to said exposure unit by said transfer means;

an image width detecting means for detecting the width of each image frame of a negative film fed to said exposure unit;

a width detecting means for detecting the widths of the photosensitive materials accommodated in said plurality of magazines; and a control means for comparing the output of said width detecting means with the output of said image width detecting means, selecting the one of said plurality of magazines accommodating a photosensitive material having a width corresponding to that of the image frame fed to said exposure unit based on the result of the comparison, having said cutter means cut the photosensitive material currently at said exposure unit, having said transfer means rewind the photosensitive film currently at said exposure unit, and having said transfer means feed the photosensitive material accommodated in the selected one of said plurality of magazines to said exposure unit;

wherein said transfer means comprises:

a driving roller provided for each of said plurality of magazines;

a roller driving unit for rotating said driving roller in two opposite directions;

a torque transmission means having a rotary member connected With each said roll of photosensitive material in said plurality of magazines for transmitting to said rotary member and to said roll rotation of said driving roller only in a direction of rewinding photosensitive material;

a friction means disposed Between said rotary member and said roll of photosensitive material for terminating the transmission of rotation to said roll from said rotary member when the load applied to said roll exceeds a predetermine value; and a tip detecting Sensor means provided between said driving roller and said exposure unit for stopping said roller driving unit when the tip of one of said rolls of photosensitive material is detected.

* * * * *